United States Patent [19]

Martinelli et al.

[11] Patent Number: 5,119,198
[45] Date of Patent: Jun. 2, 1992

[54] GAIN CONTROL DEVICE FOR MINIMIZING PARASITIC ELECTROMAGNETIC RADIATION IN A VIDEO MONITOR

[75] Inventors: Rene Martinelli, Eybens; Jacques Lacroix, Grenoble, both of France

[73] Assignee: Hewlett-Packard Company, Palo Alto, Calif.

[21] Appl. No.: 561,447

[22] Filed: Aug. 2, 1990

[30] Foreign Application Priority Data

Aug. 18, 1989 [FR] France .................. 89 11141

[51] Int. Cl.$^5$ .................. H04N 5/72; H04N 5/235
[52] U.S. Cl. .................. 358/168; 358/254
[58] Field of Search ............ 358/168, 171, 169, 173, 358/254; 333/81 R; 455/278

[56] References Cited

U.S. PATENT DOCUMENTS

| | | | |
|---|---|---|---|
| 3,037,565 | 6/1959 | Forster et al. | 358/168 |
| 3,164,673 | 5/1965 | Sharon | 358/168 |
| 3,240,874 | 3/1966 | Schreiner | 178/7.3 |
| 3,663,900 | 5/1972 | Peterson | 333/81 R |
| 3,873,767 | 3/1975 | Okada et al. | 358/169 |
| 3,881,054 | 4/1975 | Walla | 178/7.3 R |
| 3,961,361 | 6/1976 | Avins et al. | 358/169 |
| 4,236,126 | 11/1980 | Weller et al. | 333/81 R |

FOREIGN PATENT DOCUMENTS 0218457 4/1987 European Pat. Off. .
63-105582 5/1988 Japan .

OTHER PUBLICATIONS

IBM Technical Disclosure Bulletin, vol. 25, No. 6, Nov. 1982, pp. 2793-2794, W. P. Marple: "Video Gain Control".
Practical Wireless, vol. 54, No. 5, Sep. 1978, pp. 24-26m B. Dance: "TBA 120 i.f. amp. limiter demod.".

*Primary Examiner*—John K. Peng
*Assistant Examiner*—Glenton B. Burgess
*Attorney, Agent, or Firm*—Woodcock Washburn Kurtz Mackiewicz & Norris

[57] ABSTRACT

A gain control device for a CRT video monitor in which the front face of the monitor corresponds to the screen of the tube and comprises various control buttons, among which is a gain control button. A gain control button circuit receiving the video signal in accordance with the invention is arranged at the neighborhood of the monitor rear face close to the tube socket. This circuit comprises an electronic potentiometer controlled by a d.c. signal set by a potentiometer arranged at the neighborhood of the front face and coupled with the gain control button.

3 Claims, 2 Drawing Sheets

GAIN CONTROL DEVICE FOR MINIMIZING PARASITIC ELECTROMAGNETIC RADIATION IN A VIDEO MONITOR

BACKGROUND OF THE INVENTION

1. Field of the Invention

The present invention relates to the overall architecture of a video monitor and, more particularly, to its gain control assembly.

2. Description of the Prior Art

FIG. 1 schematically shows the conventional overall architecture of a video monitor and, more particularly, of the components designed to control the gain of the input video signal. As shown, the video monitor of FIG. 1 comprises a cathode-ray tube 1, a screen 2 which corresponds to the front face of the video monitor, and a socket 3 which is arranged at the rear face of the video monitor. For ergonomic and aesthetical reasons, it is generally desired to position all the control buttons of the video monitor on its front face and all the input and output signal connectors on its rear face. Thus, a cable 5 leading a video signal to a connector 6 is arranged on the monitor rear face, and this video signal is then routed towards the front face for adjustment by a potentiometer 8 set by a control button 9 and then routed back towards the rear face to a circuit 10 for amplifying and processing of the video signal. Circuit 10 is preferably arranged close to the tube socket 3.

Since the video signal is a high frequency signal, the spectrum of which is liable to have a value of about a hundred MHz, it is necessary to take steps to avoid parasitic radiations. Thus, between the connector 6 and potentiometer 8, a first portion of coaxial cable 11 is generally provided, while between this potentiometer 8 and circuit 10 a second portion of coaxial cable 12 is also provided. For a monitor screen 2 having a diagonal width of about 30 cm (12 inches), the monitor depth will be on the order of a few tens of centimeters. However, using a couple of relatively rigid coaxial cables having a length of several tens of centimeters causes several drawbacks:
- they are not easy to connect, which results in high manufacturing cost;
- they are fragile, which adversely affects quality;
- they are liable to generate a relatively high electromagnetic radiation, especially at their terminations; and
- they have to be connected to adapted impedances, which makes it compulsory, for example, for the potentiometer to provide for an intermediate impedance adaptation stage.

Despite those drawbacks, such coaxial cables are provided on practically all monitors for which it is desired to keep the control buttons on the front face.

SUMMARY OF THE INVENTION

In view of the above-mentioned drawbacks, an object of the invention is to provide for a new arrangement of the video monitor wherein the control buttons and especially the gain control button remain on the front face while connectors are arranged on the rear face, this arrangement being designed to avoid the various drawbacks of the prior art.

A specific object of the invention is to reduce assembly costs of a video monitor.

Another object of the invention is to increase its robustness.

A further object of the invention is to reduce the generated parasitic electromagnetic radiation.

Still another object of the invention is to reduce the overall manufacturing cost of a video monitor.

To achieve those objects and others, the invention provides for a gain control device for a CRT monitor, the monitor front face corresponding to the tube screen and comprising various control buttons, among which is the gain control button, while the rear face of the tube comprises connectors, among which is a video signal input connector. Preferably, the rear face is close to the tube socket 3 and to a circuit 10 for processing and amplifying the video signal. Accordingly, in this device, a gain control circuit receiving the video signal is arranged at the neighborhood of the monitor rear face close to the tube connector and comprises an electronic potentiometer controlled by a d.c. signal set by a potentiometer arranged at the neighborhood of the front face and which is coupled to the gain control button.

According to an aspect of the invention, the electronic potentiometer comprises, on the one hand, a resistor and, on the other hand, a serial connection of diodes wherein one causes a d.c. biasing current to vary by actuating the gain control button. Using such an electronic potentiometer, the gain of which is liable to be set by a d.c. signal, which is, in turn, controlled by a mechanical potentiometer, it is possible to arrange signal input connectors on the rear face and the mechanical gain setting potentiometer on the front face while avoiding the flow of high frequency signals inside the monitor due to the fact that the control of the electronic potentiometer is ensured by a d.c. current.

BRIEF DESCRIPTION OF THE DRAWINGS

The foregoing and other objects, features and advantages of the invention will be apparent from the following detailed description of preferred embodiments of the invention as illustrated in the accompanying drawings wherein.

In the drawings, like reference numerals designate similar or analogous elements.

DESCRIPTION OF A PREFERRED EMBODIMENT OF THE INVENTION

Figure 1:
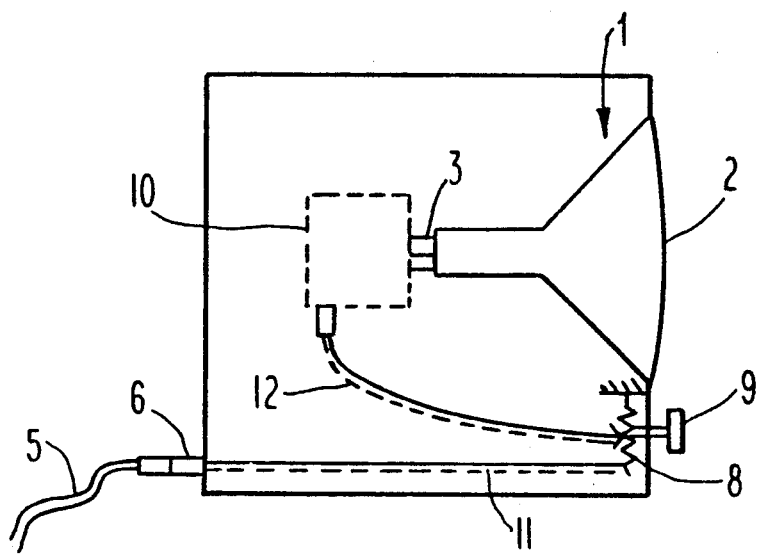
FIG. 1 illustrates the state of the art as above described.
Figure 2:
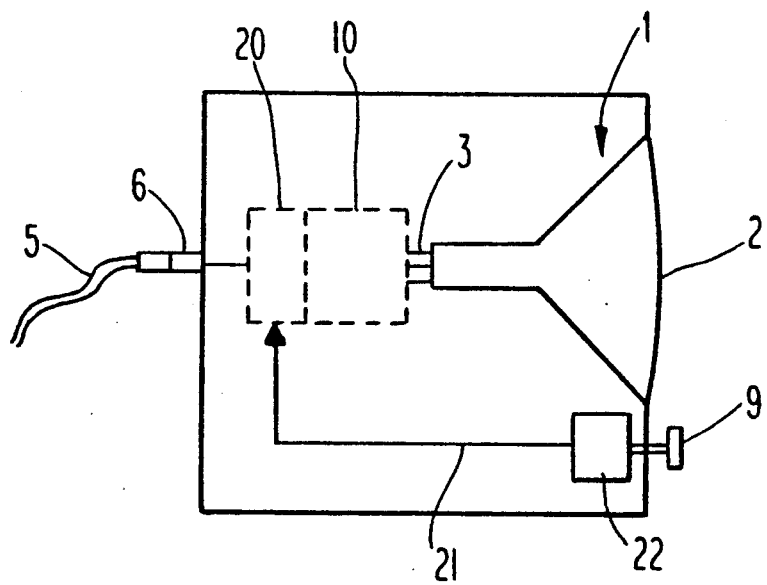
FIG. 2 shows the arrangement of a video monitor according to the invention.

FIG. 2 shows a monitor comprising a tube 1 with its screen 2 and its socket 3, an input video signal cable 5 arriving on a connector 6, a gain control button 9 on the front face and a circuit 10 for processing and amplifying video signals. According to the invention, an electronic potentiometer circuit 20 permits the gain to be set. This circuit 20 is close to the rear face of the monitor and connector 6 and is also close to the processing and amplifying video signal circuit 10 and the socket 3. Thus, the path of the high frequency video signals is reduced to a minimum length, and consequently, the parasitic high frequency electromagnetic radiations are reduced. The electronic potentiometer 20 is set by a d.c. current signal 21, the intensity of which is determined by a conventional potentiometer 22 actuated by the gain control button 9.

Figure 3:
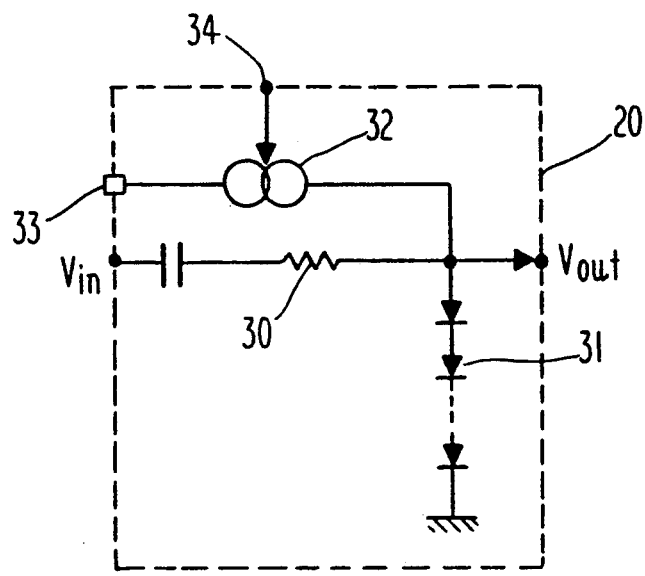
FIG. 3 is an exemplary electronic potentiometer according to the invention.

FIG. 3 schematically illustrates an exemplary electronic potentiometer circuit 20 of the invention. In this potentiometer, the input video signal $V_{in}$ arrives on a resistor 30 in series with a diode chain 31. The output signal $V_{out}$ is drawn at the intersection point between resistor 30 and diode chain 31. A d.c. current is forced to flow in this diode chain from a current source 32 connected to a constant potential 33. This current source is controllable through a control input 34. Thus, when the current source intensity varies, the forward dynamic resistance of the diodes varies together with their biasing current. Moreover, it will be noted that this variation is quasi-linear within a given intensity range, and the number of diodes will be chosen so that the circuit intensity is within this linear region.

Figure 4:
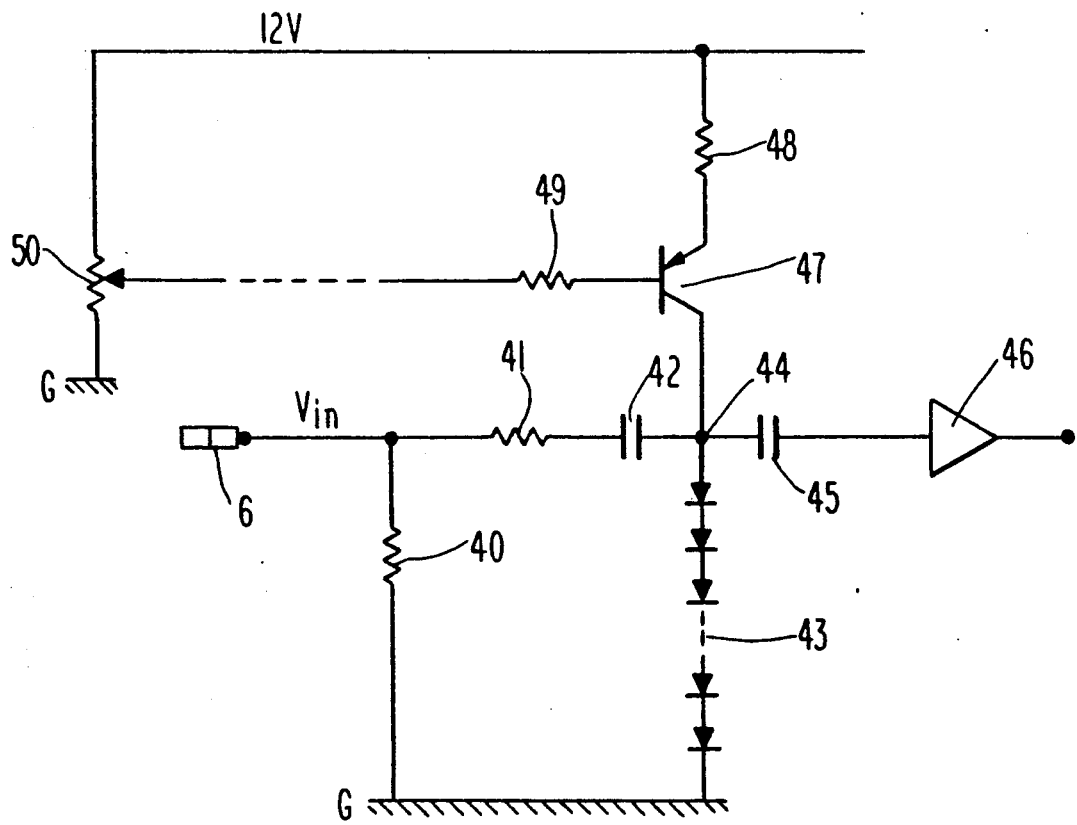
FIG. 4 shows in more detail the arrangement of an electronic potentiometer according to the invention.

FIG. 4 represents in more detail an embodiment of the electronic potentiometer and its adjustable current source. As shown, the video signal $V_{in}$ arrives on connector 6. A first resistor 40 is connected between this input and ground G. In addition, signal $V_{in}$ arrives on a resistor 41 constituting the first leg of a potentiometer for the a.c. current in series with a capacitor 42 and a diode chain 43 forming the second leg of the a.c. potentiometer. The node 44 between the capacitor 42 and the diode chain 43 is coupled through a capacitor 45 to the input of the video signal amplifying and processing circuit 46 for supplying a signal on the cathode terminal of the tube socket. On the other hand, the node 44 also is connected through a transistor 47 and a resistor 48 to a d.c. power supply, for example, 12 volts. Thus, the d.c. current flowing through the diode chain 43 and therefore the equivalent resistor of diode chain 43 depend upon the constant voltage applied on the base of transistor 47, which is connected through a resistor 49 to the cursor of a potentiometer 50, which is arranged on the front face of the monitor so that the cursor position may be set by the gain control button 9 (FIG. 2).

Of course, the invention may have numerous variants and adaptations which will clearly appear to those skilled in the art. For example, according to one of its basic aspects, the invention provides for a remote control of an electronic potentiometer fed by a high frequency current through a conventional potentiometer transmitting to this electronic potentiometer a variable d.c. current control in order to shorten as much as possible the high frequency signal paths in systems for which locations of the components are determined in order to meet ergonomic, aesthetical or practical requirements. Other benefits of the invention will be readily apparent to those skilled in the art. Thus, the invention is intended to cover all further alternatives, modifications and equivalents as may be included within the scope and spirit of the invention as defined by the appended claims.

We claim:

1. A device for controlling the gain of a cathode ray tube of a video monitor, comprising:
    a gain control button on a front face of said video monitor corresponding to a screen of said cathode ray tube;
    a video signal input connector on a rear face of said video monitor, said video signal input connector being closely disposed to a socket at the rear of said cathode ray tube;
    a video signal processing and amplifying circuit for processing and amplifying input video signals, said video signal processing and amplifying circuit also being closely disposed to said socket at the rear of said cathode ray tube;
    a potentiometer closely disposed to said front face of said video monitor and connected to said gain control button so as to receive d.c. set signals; and
    a gain control circuit responsive to said input video signals, said gain control circuit being arranged in the near vicinity of said rear face of said video monitor close to said socket at the rear of said cathode ray tube and comprising an electronic potentiometer controlled by a d.c. signal set by said potentiometer.

2. A gain control device as in claim 1, wherein said electronic potentiometer comprises a resistor and a serial connection of diodes across which said input video signals are applied to said video signal processing and amplifying circuit.

3. A gain control device as in claim 2, wherein said electronic potentiometer further comprises a d.c. biasing circuit, connected to said gain control button, for applying a d.c. biasing current to a connecting point between said resistor and said serial connection of diodes, said d.c. biasing current being varied by activation of said gain control button.

* * * * *